No. 746,227. PATENTED DEC. 8, 1903.
S. YAI.
ELECTRIC BATTERY.
APPLICATION FILED MAY 21, 1903.
NO MODEL.

Witnesses.
L. Waldman
C. Heymann

Inventor.
Sakizo Yai
by B. Singer
Att'y.

No. 746,227. Patented December 8, 1903.

UNITED STATES PATENT OFFICE.

SAKIZO YAI, OF TOKIO, JAPAN.

ELECTRIC BATTERY.

SPECIFICATION forming part of Letters Patent No. 746,227, dated December 8, 1903.

Application filed May 21, 1903. Serial No. 158,217. (No model.)

*To all whom it may concern:*

Be it known that I, SAKIZO YAI, a subject of the Emperor of Japan, residing at No. 21 Nishikuromon street, Shitaya-Ku, in the city of Tokio, Japan, have invented certain new and useful Improvements in Electric Batteries, of which the following is a specification.

The invention relates more particularly to a battery which may be used either as a primary or secondary cell; and its objects are to provide a battery of this character which may be used in general for all purposes for which an electric battery is adapted and which will be economical in construction and durable in operation.

A preferred form of this invention consists in a combination of a carbon or graphite rod with graphite powder and manganese oxid used as a negative and a zinc or lead plate used as the positive element with a solution of caustic potassium.

Figure 1:
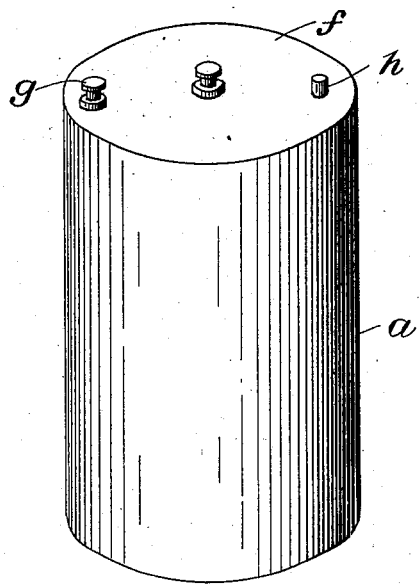
Figure 2:
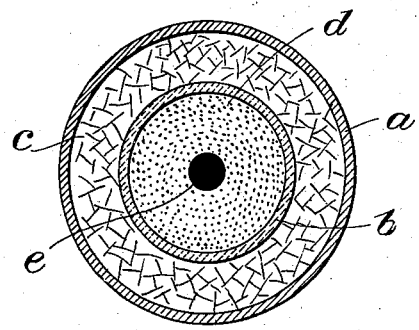

In the accompanying drawings, Figure 1 is a perspective view of a battery embodying this invention. Fig. 2 is a cross-section of the same.

A casing $a$ of any desired form is made of zinc or lead plate. As shown in the drawings, this casing is cylindrical and is provided with an interior porous cylinder $b$, preferably formed of blotting or similar paper. The annular space between the cylinders $a$ and $b$ is filled with zinc oxid, (designated by $c$,) while the cylinder $b$ is filled with a mixture of manganese oxid and graphite powder, (designated by $d$.) In the center of the cylinder $b$ is fixed a carbon or graphite rod $e$. The cover of the casing or vessel is provided with an inlet-opening $h$, through which a solution of caustic potassium is next poured in. Binding-posts $f$ and $g$ are secured to the negative and positive poles.

Electricity is generated in this improved battery by the chemical action of the caustic potassium with the carbon or graphite rod, graphite powder, and manganese oxid, and the zinc or lead plate, the zinc oxid serving to prevent the corrosion of said plate. When used as an accumulator, the current introduced reduces the oxid of zinc or lead to a spongy condition, while the oxygen acts on the manganese compound and converts it into a higher oxid. When the current is discharged, the reverse action occurs. During this action more or less corrosion of the zinc or lead plate is unavoidable; but repeated comparative experiments made with several metallic plates and other substances showed that those which do not corrode have lower electric pressure. Experiments made with silver or silver plate gave good results; but the price prohibits its use for commercial purposes.

When this device is used as a primary cell or battery, its operation is similar to that of a Leclanché cell, and it is therefore adapted to be used for telephones, electric bells, &c. When used as an accumulator, it is found to have a threefold power as compared with lead-oxid accumulators, as hitherto used. For instance, when the density of the electric current of a lead-oxid accumulator is considered at sixty, the density of the current produced by this accumulator will be one hundred and eighty. When the capacity of this battery is made about sixteen centimeters seven millimeters multiplied by seven centimeters six millimeters, the voltage given is almost 1.5 volts, with a current of ten amperes, the current being increased in proportion with the increase in the capacity of the battery.

As will be readily seen, the construction of this battery is exceedingly simple, and it can be made much smaller than those now in use to give the same results. Being entirely inclosed, it is convenient for transportation, and the batteries can be made up and kept indefinitely by not adding the solution of caustic potassium until ready for use. In this way no deterioration will occur in the battery from lapse of time, as occurs in the common dry batteries.

Having thus described my invention, which, however, I do not wish to limit to the exact form shown, what I claim, and desire cure by Letters Patent, is—

In an electric battery, the combinat a negative element comprising a carbon rod surrounded by a mixture of graphite powder and manganese oxid, a positive element comprising a zinc plate surrounded by zinc oxid, a porous separator between said elements and a solution of caustic potassium substantially as described.

In testimony whereof I affix my signature in presence of two witnesses.

SAKIZO YAI.

Witnesses:
R. S. MILLER,
M. ERKI.